United States Patent [19]
Taniguchi

[11] Patent Number: 5,546,796
[45] Date of Patent: Aug. 20, 1996

[54] METHOD AND APPARATUS FOR MEASURING AXLE LOAD OF A RUNNING VEHICLE

[75] Inventor: Kunio Taniguchi, Kanagawa, Japan

[73] Assignee: Omron Corporation, Japan

[21] Appl. No.: 498,311

[22] Filed: Jul. 5, 1995

[30] Foreign Application Priority Data

Jul. 6, 1994 [JP] Japan .................................. 6-154993

[51] Int. Cl.$^6$ .................................................. E01C 23/00
[52] U.S. Cl. .................................................. 73/146
[58] Field of Search ..................... 73/146, 7, 8; 177/134; 364/426.02

[56] References Cited

U.S. PATENT DOCUMENTS

| | | |
|---|---|---|
| 4,049,069 | 9/1977 | Tamamura et al. . |
| 4,912,967 | 4/1990 | Shiraishi et al. . |
| 5,289,718 | 3/1994 | Mousseau .................. 73/146 |

FOREIGN PATENT DOCUMENTS 491655  6/1992  France .

WO92/21009  11/1992  WIPO .

Primary Examiner—Richard Chilcot
Assistant Examiner—William L. Oen
Attorney, Agent, or Firm—Dickstein, Shapiro & Morin

[57] ABSTRACT

Axle load meters are arranged in an axle load measuring area of a road. Instantaneous axle load values $W_1, W_2, \ldots, W_n$ are sampled from outputs of the axle load meters at time points $t_1, t_2, \ldots, t_n$ as measured from a time point when the running vehicle enters the axle load measuring area. Pairs of instantaneous axle load values $(W_1, W_{1+Tk}), (W_2, W_{2+Tk}), \ldots, (W_i, W_{i+Tk})$ at time points $(t_1, t_{1+k}), (t_2, t_{2+k}), \ldots, (t_i, t_{i+k})$ each having a fixed time interval $T_k$ ($k=1$ to $j$) are determined based on the measured instantaneous axle load values $W_1, W_2, \ldots, W_n$, and average values $W_{1Tk}, W_{2Tk}, \ldots, W_{iTk}$ of the respective pairs are calculated, to thereby produce average value groups for the respective fixed time intervals $T_1, T_2, \ldots, T_j$. An average value group having a minimum variation is selected from the average value groups, and an average of the selected average value group is employed as the axle load of the running vehicle.

4 Claims, 5 Drawing Sheets

THIN LINE: MAIN VIBRATION
THICK LINE: AUXILIARY VIBRATION

METHOD AND APPARATUS FOR MEASURING AXLE LOAD OF A RUNNING VEHICLE

BACKGROUND OF THE INVENTION

The present invention relates to a method and apparatus for measuring the axle load of a running vehicle and, particularly, to such a method and apparatus capable of performing computation in a sufficiently short period by virtue of a small amount of computation needed.

An apparatus is known which determines the weight of a running vehicle by measuring vertical forces (hereinafter referred to as axle loads) that are imparted to the road surface by the respective axles of the vehicle and summing up the measured axle loads.

By the way, while running, a vehicle vibrates at resonance frequencies corresponding to the entire body and respective portions due to impacts that are caused by asperity of a road, acceleration, etc. Therefore, the instantaneous vertical force imparted to the road surface by an axle of a running vehicle varies as shown in FIG. 7. In FIG. 7, the thin line indicates a waveform corresponding to a main vibration of a running vehicle and the thick line indicates a waveform corresponding to a combined vibration of the main vibration and an auxiliary vibration of the running vehicle. The main vibration means a resonance of the entire vehicle and the auxiliary vibration means a resonance that occurs at a portion of the vehicle or a load.

Thus, a waveform as shown in FIG. 7 is obtained when axle load meters are arranged along a road and outputs of those axle load meters are picked up upon passage of a vehicle. Conventionally, the axle load of a running vehicle is determined from such a waveform according to the following methods.

1) Wave components of an output of an axle load meter is dealt with as errors. More specifically, the axle load of a running vehicle is measured by an axle load meter installed at a selected measuring location where vibration of a running vehicle is as small as possible. The midpoint of vibration is directly determined from outputs of the axle load meter, and employed as an axle load measurement value of the running vehicle.

2) Axle load meters are stalled at a plurality of measuring locations. A main vibration waveform corresponding to a resonance frequency of the entire vehicle and an auxiliary vibration waveform produced by a resonance at a portion of the vehicle are estimated from a partial waveform obtained by those axle load meters. The midpoint of vibration is determined from the estimated main vibration waveform and auxiliary vibration waveform, and employed as an axle load measurement value of the running vehicle.

3) To simplify method 2), a main vibration and an auxiliary vibration are estimated with an assumption that the frequency of the main vibration is equal to or around 3 Hz. The midpoint of a resulting vibration is determined and employed as an axle load measurement value of the running vehicle.

However, in method 1), in which a wave portion of an output of the axle load meter is dealt with as errors, the measurement accuracy is low even if the measurement by the axle load meter is performed at a location where vibration of a running vehicle is as small as possible. Further, method 1) has a problem that the axle load meter installation point is restricted.

In method 2), in which a main vibration waveform corresponding to a resonance frequency of the entire vehicle and an auxiliary vibration waveform produced by a resonance at a portion of the vehicle are estimated from a partial waveform obtained by the axle load meters, the amount of computation becomes enormous and it is therefore difficult to complete the computation in a required time even with the use of a high-speed computer. Where vehicles pass successively, the "required time" means a time from a time point when the first vehicle passes a measuring point to a time point when the second vehicle passes it.

Further, in method 2), the axle load meters are required to have high measurement accuracy. In method 2), a vibration waveform of a vehicle is computed, estimated and reproduced based on a partial waveform measured by the axle load meters. Therefore, if the accuracy of the axle load meters is low, measurement errors of the axle load meters are amplified to prevent a correct measurement.

In method 3), the frequency of a main vibration is assumed to be equal to or around 3 Hz. Therefore, although method 3) is suitable for measurements on large-sized vehicles having a main vibration whose frequency is equal to or around 3 Hz, it may cause a large error for other types of vehicles having a main vibration whose frequency is not in that range. In addition, the reliability of measurement data is low because not all large-sized vehicles have a main vibration whose frequency is equal to or around 3 Hz.

SUMMARY OF THE INVENTION

An object of the present invention is to provide a method and apparatus for measuring the axle load of a running vehicle which can not only produce measurement data that are within a stable error range without amplifying measurement errors of each axle load meter, but also produce highly reliable measurement data without using a high-speed computer.

According to the invention, there is provided an apparatus for measuring an axle load of a running vehicle, comprising:

axle load meters arranged in an axle load measuring area of a road;

means for measuring, using the axle load meters, instantaneous axle load values $W_1, W_2, \ldots, W_n$ at time points $t_1, t_2, \ldots, t_n$, respectively, as measured from a time point when the running vehicle enters the axle load measuring area;

means for setting fixed time intervals $T_1, T_2, \ldots, T_j$, where $j$ is an integer not less than 2;

means for determining pairs of instantaneous axle load values $(W_1, W_{1+Tk}), (W_2, W_{2+Tk}), \ldots, (W_i, W_{i+Tk})$ at time points $(t_1, t_{1+k}), (t_2, t_{2+k}), \ldots, (t_i, t_{i+k})$ each having a fixed time interval $T_k$, where $k=1$ to $j$, based on the measured instantaneous axle load values $W_1, W_2, \ldots, W_n$, and calculating average values $W_{1Tk}, W_{2Tk}, \ldots, W_{iTk}$ of the respective pairs, to thereby produce average value groups for the respective fixed time intervals $T_1, T_2, \ldots, T_j$;

means for selecting an average value group having a minimum variation from the average value groups; and means for employing an average of the selected average value group as the axle load of the running vehicle.

In the above apparatus, each interval between adjacent ones of the time points $t_1, t_2, \ldots, t_n$ may have a constant value $\alpha$, and the fixed time intervals $T_1, T_2, \ldots, T_j$ may be integer multiples of the constant value $\alpha$.

DESCRIPTION OF THE PREFERRED EMBODIMENT

A method and apparatus for measuring the axle load of a running vehicle according to an embodiment of the present invention will be described in detail with reference to the accompanying drawings.

Figure 1:
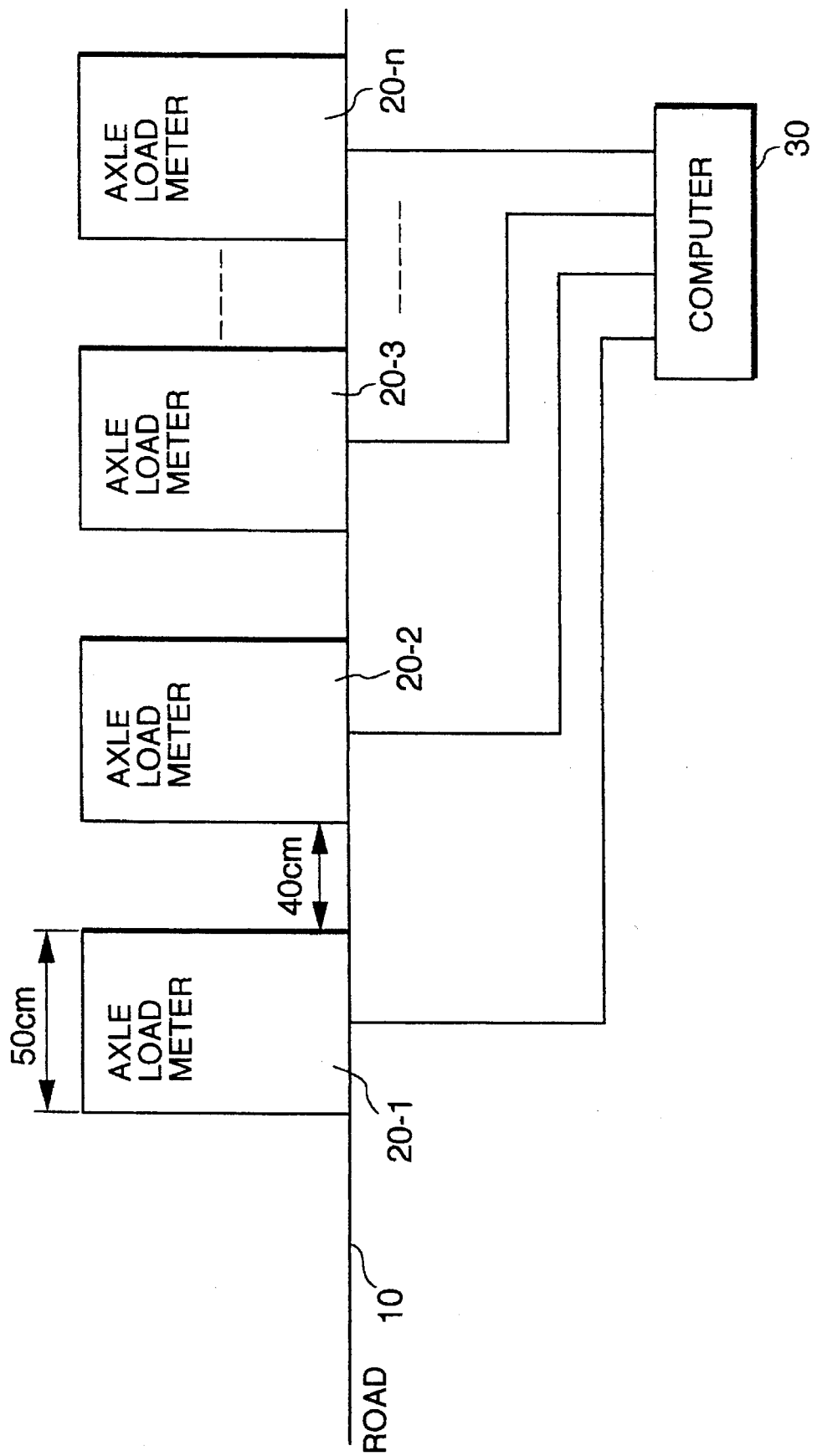
FIG. 1 shows a general configuration of an apparatus for measuring the axle load of a running vehicle according to an embodiment of the present invention.

FIG. 1 shows a general configuration of an apparatus for measuring the axle load of a running vehicle according to the embodiment of the invention. In this embodiment, n axle load meters 20-1, 20-2, 20-3, . . ., 20-n are installed along a road 10 on which vehicles (not shown) run. Measurement values of the respective axle load meters 20-1, 20-2, 20-3, . . ., 20-n are sent to a computer 30 that is connected to those axle load meters.

In this embodiment, each of the axle load meters 20-1, 20-2, 20-3, . . ., 20-n has an effective measurement width (i.e., length along the vehicle running direction on the road surface on which the axle load meters are installed) of about 50 cm, and the interval between the adjacent axle load meters is set at 40 cm. While these values are selected in consideration of the fact that the interval between the axles of one vehicle much varies with the kind of vehicle, it is apparent that other various values may be used.

The measurement accuracy is improved as the number n of installed axle load meters is increased. Where the width of each axle load meter and the interval between the adjacent axle load meters are respectively set at 50 cm and 40 cm and n is set at 7, highly accurate measurements can be performed for vehicles running at 80 km/hour or less.

First, a description will be made of the principle of measuring an axle load value in this embodiment.

Figure 2:
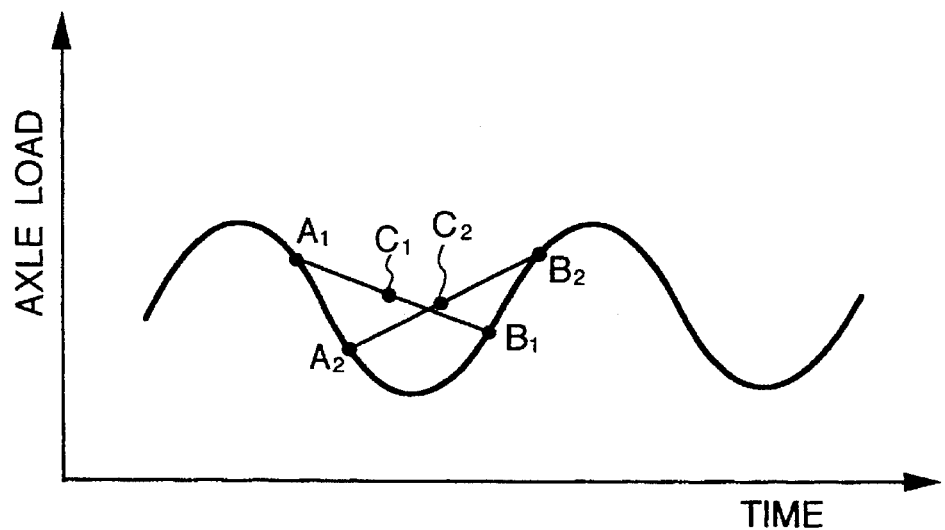
FIG. 2 illustrates the principle of measuring an axle load value in the invention.

In general, a main vibration of a vehicle running along the load 10 is represented by simple harmonic motion as shown in FIG. 2, which satisfies $$\sin\theta + \sin\{\theta + (2n+1)\pi\} = 0 \qquad (1)$$

where $\theta$ denotes the phase.

In the simple harmonic motion of FIG. 2, if the midpoint of arbitrary two points A1 and B1 of a measurable portion is denoted by C1 and the midpoint of another two points A2 and B2 that are close to the respective points A1 and B1 and have the same time interval as the points A1 and B1 is denoted by C2, an average of C1 and C2 is located within the amplitude variation range of the simple harmonic motion.

Further, plural pairs of points each of which are close to the points A1 and B1 and have the same time interval as the points A1 and B1 are taken, and their plural midpoints are denoted by C2, C3, . . . If a locus of the midpoints C1, C2, C3, . . . is flat, the time interval between the points A1 and B1 is equal to $(2n+1)\pi$ from Equation (1) and the midpoints C1=C2=C3=. . . are located at the center of the simple harmonic motion.

In this embodiment, pairs of instantaneous axle load values $(W_1, W_{1+k})$, $(W_2, W_{2+k})$, . . ., $(W_i, W_{i+k})$ respectively measured at $(t_1, t_{1+k})$, $(t_2, t_{2+k})$, . . ., $(t_i, t_{i+k})$ having a fixed time interval $T_k$ are extracted from outputs of the n axle load meters 20-1, 20-2, 20-3, . . ., 20-n. Further, average values $W_{1k}, W_{2k}, \ldots, W_{ik}$ of the respective pairs $(W_1, W_{1+k})$, $(W_2, W_{2+k})$, . . ., $(W_i, W_{i+k})$ are calculated.

An average $W_{0k}$ of the average values $W_{1k}, W_{2k}, \ldots, W_{ik}$ is smaller than the maximum value and larger than the minimum value of the main vibration of a running vehicle.

Therefore, by calculating the average $W_{0k}$ of the average values $W_{1k}, W_{2k}, \ldots, W_{ik}$, i.e., by performing the following calculation:

$$W_{0k} = \Sigma W_{ik}/i, \qquad (2)$$

an axle load value of the running vehicle can be obtained from the calculated value $W_{0k}$.

According to the above method, the axle load value can be determined with higher accuracy than method 1) where a wave portion of an output of an axle load meter is dealt with as errors, and by simpler calculations than methods 2) and 3).

To further improve the measurement accuracy of the axle load value, a plurality of time intervals $T_1, T_2, \ldots, T_j$ may be set instead of employing the single fixed time interval $T_k$ as in the above case. For each of the time intervals $T_k$ (k=1 to j), pairs of instant axle load values $(W_1, W_{1+k})$, $(W_2, W_{2+k})$, . . ., $(W_i, W_{i+k})$ respectively measured at $(t_1, t_{1+k})$, $(t_2, t_{2+k})$, . . ., $(t_i, t_{i+k})$ having a time interval $T_k$ are extracted, and average values $W_{1k}, W_{2k}, \ldots, W_{ik}$ of the respective pairs $(W_1, W_{1+k})$, $(W_2, W_{2+k})$, . . ., $(W_i, W_{i+k})$ are calculated. Further, among plural groups of average values $W_{1k}, W_{2k}, \ldots, W_{ik}$, a group $W_{1p}, W_{2p}, \ldots, W_{ip}$ having a minimum variation is selected, and an average $W_{0p}$ of the average value group $W_{1p}, W_{2p}, \ldots, W_{ip}$, which corresponds to a time interval $T_p$, is calculated such that $$W_{0p} = \Sigma W_{ik}/i \qquad (3)$$

The value $W_{0p}$ is employed as the axle load value of the running vehicle.

As is apparent from Equation (1), the time interval $T_p$ is closest to ½ of the period of the main vibration of the running vehicle. When the time interval $T_p$ is equal to ½ of the period of the main vibration of the running vehicle, the average value group $W_{1p}, W_{2p}, \ldots, W_{ip}$ corresponds to the auxiliary vibration of the running vehicle.

The average of a plurality of measurement values of the auxiliary vibration having the center of the main vibration of the running vehicle as the midpoint, i.e., the average of the values $W_{1p}, W_{2p}, \ldots, W_{ip}$ is approximated to the midpoint of the auxiliary vibration as the number of sampling points is increased.

Therefore, the axle load value can be obtained with high accuracy by determining the average $W_{0p}$ of the average value group $W_{1p}, W_{2p}, \ldots, W_{ip}$ corresponding to the time interval $T_p$. The calculations for determining the axle load value of the running vehicle is much simpler than in methods 2) and 3).

Figure 3:
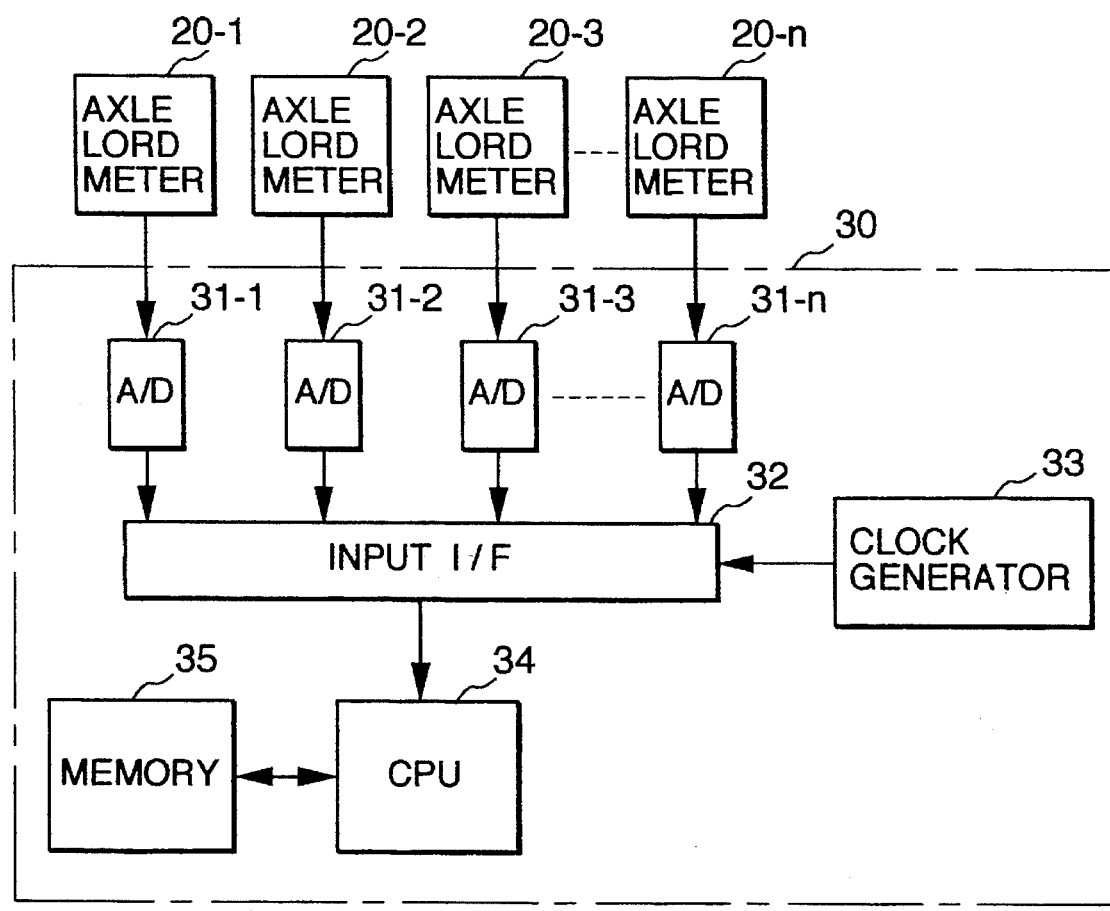
FIG. 3 is a functional block diagram showing a configuration of a computer 30 shown in FIG. 1.

FIG. 3 is a functional block diagram showing a configuration of the computer 30 shown in FIG. 1.

Referring to FIG. 3, the computer 30 consists of the following components. Analog/digital converters 31-1, 31-2, 31-3, . . ., 31-n correspond to the axle load meters 20-1, 20-2, 20-3, . . ., 20-n, respectively. A clock generator 33 generates prescribed sampling pulses. An input interface 32 takes in outputs of the analog/digital converters 31-1, 31-2, 31-3, . . ., 31-n based on the prescribed sampling pulses that are supplied from the clock generator 33. A CPU 34 supervises the entire operation of the computer 30. A memory 35 stores various data necessary for the operation of the CPU 34.

Analog signals that are output from the axle load meters 20-1, 20-2, 20-3, . . ., 20-4 are converted to digital signals by the analog/digital converters 31-1, 31-2, 31-3, . . ., 31-n, and taken in by the CPU 34 via the input interface 32 based on the prescribed sampling pulses supplied from the clock generator 33.

Measurement data that have been input to the CPU 34, i.e., measurement values (hereinafter called "instantaneous axle load values") $W_1, W_2, \ldots, W_n$ at time points $t_1, t_2, \ldots, t_n$ as measured from the entrance time of a running vehicle into the axle load measuring area are temporarily stored in the memory 35. If these values are plotted on a graph (vertical axis: axle load; horizontal axis: time) in the same manner as in FIG. 2, a waveform is obtained which is close to a sine wave. Therefore, the axle load value can be determined according to the measurement principle described above.

Figure 4:
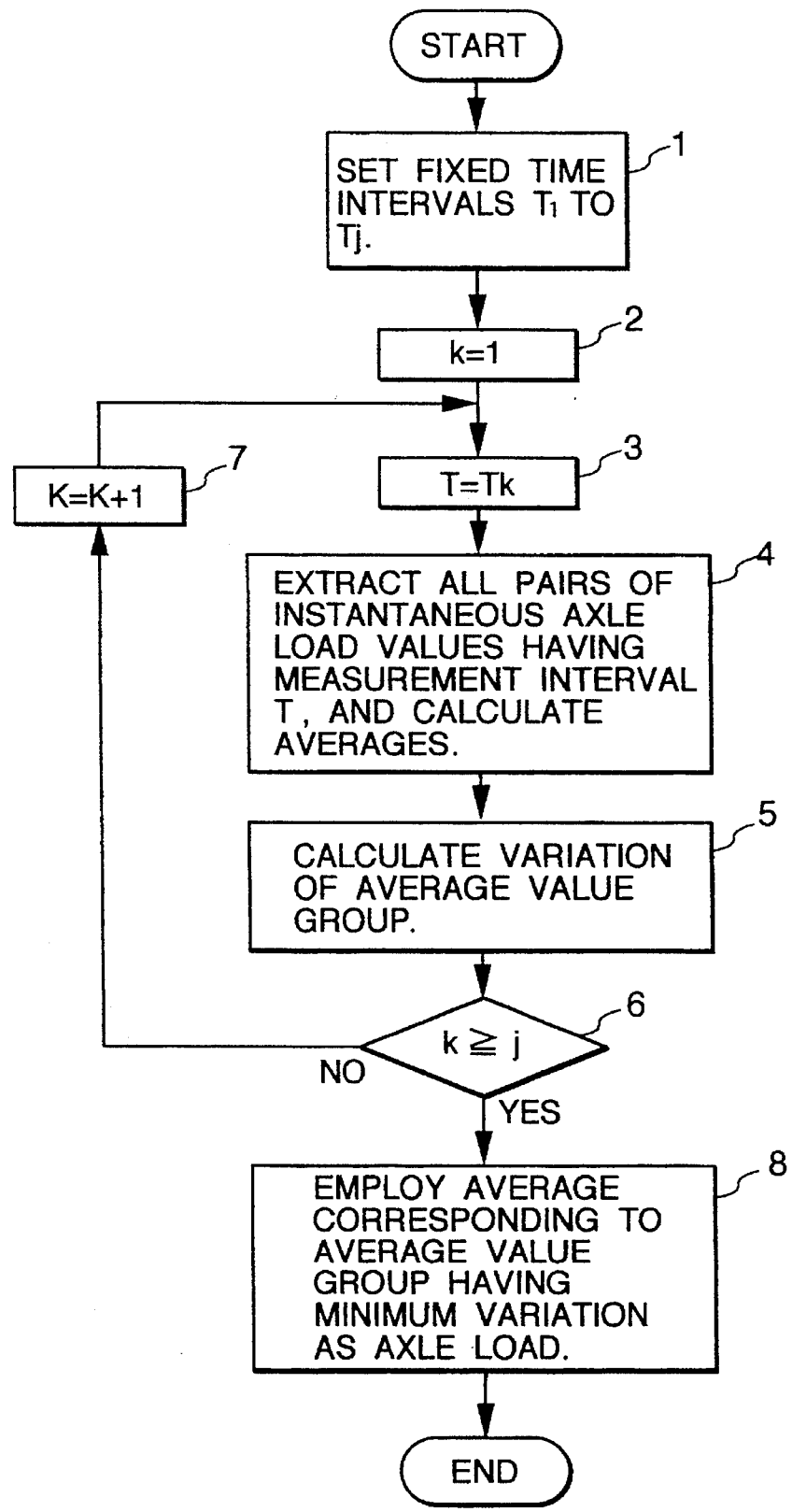
FIG. 4 is a flowchart showing an example of processing of a CPU shown in FIG. 3.

FIG. 4 is a flowchart showing an example of processing of the CPU 34 shown in FIG. 3.

First, j fixed time intervals $T_1$ to $T_j$ are set in step 1. The fixed time interval is an estimated value of the ½ period which value is reversely calculated from a certain frequency. Although the fixed time intervals $T_1$ to $T_j$ may be set in a variety of manners, in this embodiment they are set in the following manner in consideration of the characteristics of the main vibration of a running vehicle.

It is known that the frequency of the main vibration of a running vehicle is 2–3 Hz when it is a large-sized vehicle, and is 3–5 Hz when it is a small-sized vehicle. The ½-period range corresponding to the frequency range of 2 to 5 Hz is 0.1 to 0.25 second. Therefore, it is effective to set $T_1$ to $T_j$ within the range of 0.1 to 0.25 second.

Further, if the fixed time intervals $T_1$ to $T_j$ are set at integer multiples of the pulse cycle (denoted by $\alpha$) of the clock generator 33, the following calculations are conveniently performed which use the instantaneous axle load values $W_1, W_2, \ldots, W_n$. It is however noted that setting the fixed time intervals at integer multiples of $\alpha$ is not a requisite.

A parameter k is set at 1 in step 2, and $T_k$ is substituted into T in step 3. At this time, T is equal to $T_1$, and the following calculation is performed with the time interval $T_1$.

In step 4, all the pairs of instantaneous axle load values $W_1, W_2, \ldots, W_n$ which pairs have the time interval T are extracted, and an average value of each pair of instantaneous axle load values is calculated.

Where the fixed time interval is not an integer multiple $m\alpha$ (m: integer) of the pulse cycle $\alpha$ but is, for instance, $m\alpha+\beta(0<\beta<\alpha)$, the measurement values themselves of the instantaneous load cannot be used for the above averaging. In this case, necessary values should be estimated.

Now, a description will be made of a method of estimating an instantaneous axle load value $W_{1+T}$ at a time point $m\alpha+\beta$ after the time point $t_1$ in calculating an average value of an instantaneous axle load value $W_1$ at $t_1$ and the instantaneous axle load value $W_{1+T}$.

Figure 5:
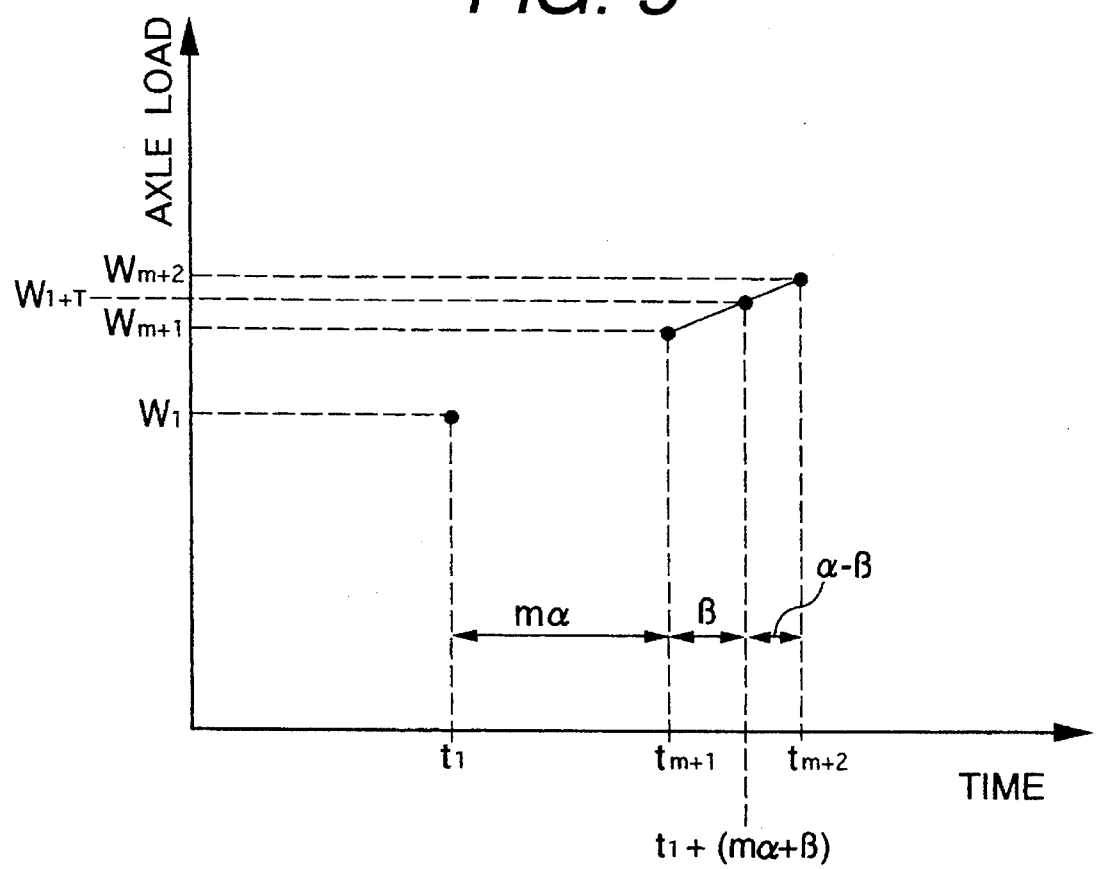
FIG. 5 illustrates a method of calculating an instantaneous axle load value $W_{1+T}$ with a fixed time interval of $m\alpha+\beta$.
Figure 7:
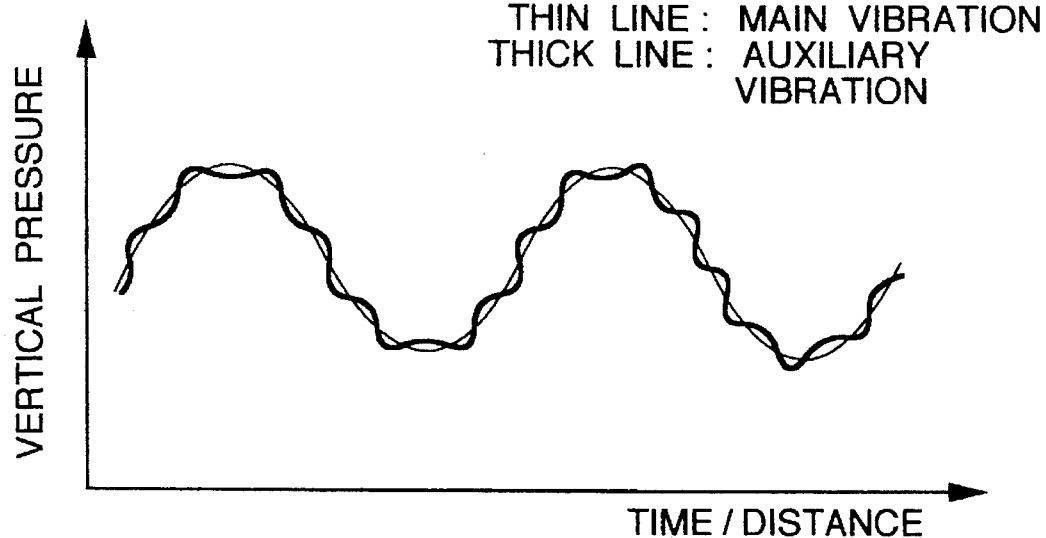
FIG. 7 is a graph showing the instantaneous vertical force imparted to a road surface by the axle of a running vehicle as a function of time.

Referring to FIG. 5, since the pulse cycle is $\alpha$, if $t_n$ and $t_{n-1}$ are defined as $$t_n - t_{n-1} = \alpha \text{ (n: integer not less than 2)},$$

the time point $m\alpha+\beta$ after the time point $t_1$ satisfies $$t_{m+1} < t_1 + (m\alpha+\beta) < t_{m+2}$$

where $m\alpha+\beta$ is the fixed time interval.

In this embodiment, as shown in FIG. 5, two points having coordinates $(t_{m+1}, W_{m+1})$ and $(t_{m+2}, W_{m+2})$ are connected to each other by a straight line, and the axle load coordinate of a point located on that straight line and having a time coordinate $t_1+(m\alpha+\beta)$ is employed as $W_{1+T}$. Then, an average value of $W_1$ and $W_{1+T}$ is calculated. Since $t_{m+2}-t_{m+1}=\alpha$, $W_{1+T}$ is calculated as $$W_{1+T}=W_{m+1}+\beta(W_{m+2}-W_{m+1})/\alpha.$$

Figure 6:
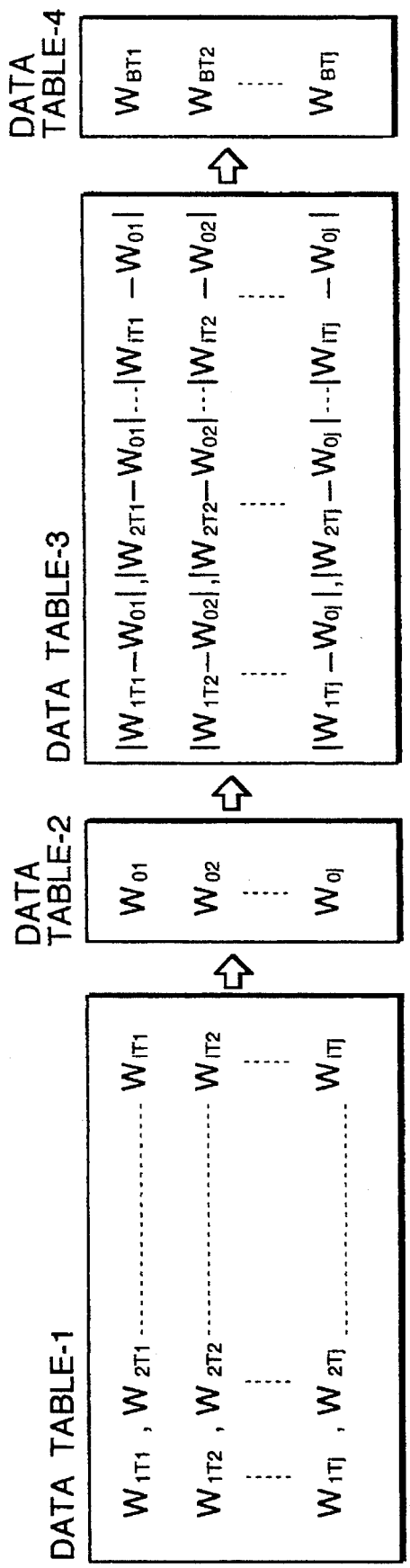
FIG. 6 illustrates data tables stored in a memory of the CPU shown in FIG. 3.

After all the average values have been calculated, a variation of each average value group is calculated in step 5. Although there are various methods of calculating the variation such as calculating a difference between the maximum and minimum values of an average value group, this embodiment employs the following method. As shown in FIG. 6, an average $W_{01}$ of respective elements $W_{1T1}, W_{2T1}, \ldots, W_{iT1}$ (i: natural number) of the average value group shown in data table-1 is calculated (see data table-2). Then, absolute values (see data table-3) of differences between $W_{01}$ and the respective elements of the average value group are averaged (see data table-4). By employing an absolute value average $W_{BT1}$ as a variation, even if there exists an instantaneous axle load value that is far different from the other values, its influence on the average can be made small.

In step 6, it is judged whether the calculations have been completed for all the j fixed time intervals. If the judgment result is negative, k is incremented by 1 in step 7 and a variation will be calculated in the similar manner for the next fixed time interval. When the calculations have been completed for all the j fixed time intervals, the minimum one (closest to 0) is determined from the j variations thus calculated, and the average of the average value group corresponding to the minimum variation is employed as the axle load value (step 8).

With the above constitution, the invention provides the following advantages:

1) Measurement values can be obtained within a stable error range without amplifying measurement errors of the individual axle load meters irrespective of the phase of a main vibration at an instant when a running vehicle enters the axle load measuring area and its relationship with the phase of an auxiliary vibration. Therefore, the measurement values are highly reliable.

2) A wide variety of vehicles can be subjected to the measurement; that is, the application of the invention is not limited to vehicles whose main vibration has a frequency of 3 Hz.

3) Where the amplitude of an auxiliary vibration is smaller than a main vibration, measurement values can be obtained with very high accuracy.

4) By virtue of a small amount of computation, the computation can be completed in a sufficiently short period even with a personal computer. Therefore, all the vehicles passing successively can be subjected to the measurement.

What is claimed is:

1. An apparatus for measuring an axle load of a running vehicle, comprising:

axle load meters arranged in an axle load measuring area of a road;

means for measuring, using the axle load meters, instantaneous axle load values $W_1, W_2, \ldots, W_n$ at time points $t_1, t_2, \ldots, t_n$, respectively, as measured from a time point when the running vehicle enters the axle load measuring area;

means for setting fixed time intervals $T_1, T_2, \ldots, T_j$, where j is an integer not less than 2;

means for determining pairs of instantaneous axle load values $(W_1, W_{1+Tk}), (W_2, W_{2+Tk}), \ldots, (W_i, W_{i+Tk})$ at time points $(t_1, t_{1+k}), (t_2, t_{2+k}), \ldots, (t_i, t_{i+k})$ each having a fixed time interval $T_k$, where k=1 to j, based on the measured instantaneous axle load values $W_1, W_2, \ldots, W_n$, and calculating average values $W_{1Tk}, W_{2Tk}, \ldots, W_{iTk}$ of the respective pairs, to thereby produce average value groups for the respective fixed time intervals $T_1, T_2, \ldots, T_j$;

means for selecting an average value group having a minimum variation from the average value groups; and means for employing an average of the selected average value group as the axle load of the running vehicle.

2. The apparatus of claim 1, wherein each interval between adjacent ones of the time points $t_1, t_2, \ldots, t_n$ has a constant value $\alpha$, and the fixed time intervals $T_1, T_2, \ldots, T_j$ are integer multiples of the constant value $\alpha$.

3. A method for measuring an axle load of a running vehicle based on measurement outputs of axle load meters arranged in an axle load measuring area of a road, comprising the steps of;

measuring, using the axle load meters, instantaneous axle load values $W_1, W_2, \ldots, W_n$ at time points $t_1, t_2, \ldots, t_n$, respectively, as measured from a time point when the running vehicle enters the axle load measuring area;

setting fixed time intervals $T_1, T_2, \ldots, T_j$, where j is an integer not less than 2;

determining pairs of instantaneous axle load values $(W_1, W_{1+Tk}), (W_2, W_{2+Tk}), \ldots, (W_i, W_{i+Tk})$ at time points $(t_1, t_{1+Tk}), (t_2, t_{2+k}), \ldots, (t_i, t_{i+k})$ each having a fixed time interval $T_k$, where k=1 to j, based on the measured instantaneous axle load values $W_1, W_2, \ldots, W_n$, and calculating average values $W_{1Tk}, W_{2Tk}, \ldots, W_{iTk}$ of the respective pairs, to thereby produce average value groups for the respective fixed time intervals $T_1, T_2, \ldots, T_j$;

selecting an average value group having a minimum variation from the average value groups; and employing an average of the selected average value group as the axle load of the running vehicle.

4. The method of claim 3, wherein each interval between adjacent ones of the time points $t_1, t_2, \ldots, t_n$ has a constant value $\alpha$, and the fixed time intervals $T_1, T_2, \ldots, T_j$ are integer multiples of the constant value $\alpha$.

* * * * *